United States Patent [19]
Broder et al.

[11] Patent Number: 5,991,808
[45] Date of Patent: Nov. 23, 1999

[54] TASK PROCESSING OPTIMIZATION IN A MULTIPROCESSOR SYSTEM

[75] Inventors: Andrei Broder, Menlo Park; Michael Mitzenmacher, Milpitas, both of Calif.

[73] Assignee: Digital Equipment Corporation, Maynard, Mass.

[21] Appl. No.: 08/867,095

[22] Filed: Jun. 2, 1997

[51] Int. Cl.[6] .................................................. G06F 15/16
[52] U.S. Cl. ........................ 709/226; 709/104; 709/105; 709/203; 709/226; 709/229; 709/243
[58] Field of Search .................................... 709/203, 226, 709/229, 243, 227, 104, 105; 7070/10

[56] References Cited

U.S. PATENT DOCUMENTS

| | | | |
|---|---|---|---|
| 5,239,653 | 8/1993 | Cubero-Castan et al. | 395/200.72 |
| 5,241,677 | 8/1993 | Naganuma et al. | 395/675 |
| 5,249,290 | 9/1993 | Heizer | 395/675 |
| 5,548,724 | 8/1996 | Akizawa et al. | 395/200.33 |
| 5,644,720 | 7/1997 | Boll et al. | 709/227 |
| 5,652,751 | 7/1997 | Sharony . | |
| 5,655,120 | 8/1997 | Witte et al. | 395/675 |
| 5,745,913 | 4/1998 | Pattin et al. . | |
| 5,819,255 | 10/1998 | Celis et al. . | |
| 5,893,910 | 4/1999 | Martineau et al. | 707/10 |

OTHER PUBLICATIONS

Shivaratri et al., "Load Distributing Systems", IEEE, pp. 33–44, Dec. 1992.
Lee, Gil–Haeng, "Using System State Information for Adaptive State Polling Policy in Distributed Load Balancing", IEEE, pp. 166–173, Mar. 1997.

*Primary Examiner*—Frank J. Asta
*Assistant Examiner*—Almari Romero
*Attorney, Agent, or Firm*—Pennie & Edmonds LLP

[57] ABSTRACT

A method of operating a multiprocessor system having a predefined number of processing units for processing data, includes obtaining load information representing a loading of each of a number of randomly selected ones of the processing units. The number of randomly selected processing units is greater than 1 and substantially less than the predefined number of processing units. A least loaded of the randomly selected processing units is identified from the obtained load information. The data is directed to the identified least loaded randomly selected processing unit for processing.

36 Claims, 9 Drawing Sheets

TASK PROCESSING OPTIMIZATION IN A MULTIPROCESSOR SYSTEM

TECHNICAL FIELD

The present invention is generally related to multiprocessor systems and more particularly to a technique for optimizing task processing in a multiprocessor environment.

BACKGROUND ART

Distributed computing systems, such as banks or networks of workstations or servers or mirrored sites on the World Wide Web, face the problem of using their resources effectively. If some hosts lie idle while others are heavily loaded, system performance can fall significantly. To prevent this, load balancing is used to distribute the workload, improving performance measures such as the expected time a task spends in the system. Although determining an effective load balancing strategy depends largely on the details of the underlying system, general models from both queueing theory and computer science often provide valuable insight and general rules of thumb.

In a system of n servers, incoming tasks must choose a server and wait for service. If an incoming task knows exactly the current number of tasks already queued at each server and can instantaneously be queued, it is usually best for the task to go to the server with the shortest queue. In many actual systems, however, it is unrealistic to assume that tasks will have access to up-to-date load information; global load information may be updated only periodically, or the time delay for a task to move to a server may be long enough that the load information is out of date by the time the task arrives. Unlike in systems in which up-to-date load information is available, the strategy of going to the shortest queue can lead to extremely bad behavior when load information is out-of-date. Systems which attempt to exploit global information to balance load too aggressively may suffer in performance, either by misusing it or by adding significant complexity. Hence, it is often not clear what the best load balancing strategy is.

If old information is utilized in selecting one of multiple servers for servicing a task, a phenomenon which can be characterized as "herding" may occur. More particularly, if multiple clients are directing tasks to particular servers based upon the stale information, numerous tasks may be directed to the server which the stale information indicates to be the least loaded but which, in fact, has a current loading which exceeds the current loading of other servers.

For example, if the available loading information is updated every T seconds, all tasks directed during the T second period will be directed to what appears to be the least loaded server. This may significantly increase the number of tasks queued for service at that server while the actual number of tasks queued for service at other servers is significantly less than that of the server to which the tasks are being directed. Hence, any delay in updating server loadings can result in herding, since tasks are directed to what appears to be the least loaded of the servers based upon stale loading information.

It will be recognized by those skilled in the art that this phenomena can occur whether the multiserver system is a homogeneous system, i.e., a system in which each of the servers is substantially similar and preferably all queues are equally loaded, or a heterogeneous system in which servers have different processor speeds, etc., and beneficially the server loadings are balanced in view of the differences in the respective server capabilities.

Various techniques have been proposed to balance the loading in multiserver environments. However, the proposed techniques have generally relied on complex algorithms and models which are difficult to implement and require substantial system overhead during operations. Accordingly, there remains a need for simple techniques for balancing the loadings of multiple processors servers in a client-server environment.

OBJECTIVES OF THE INVENTION

It is therefore an objective of the present invention to provide enhanced optimization in task processing in a multiprocessor environment.

It is a further object of the present invention to provide enhanced optimization of task processing in a multiprocessor environment using stale loading information.

It is a still further object of the present invention to provide enhanced optimization of task processing in a multiuser, multiprocessor environment by avoiding herding.

It is a yet another object of the present invention to provide enhanced optimization of task processing in a multiuser, multiprocessor environment with a low level of processing overhead.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the present invention, a system, such as a multiprocessor computing system, is provided for servicing an item, e.g., processing data. The system includes a plurality of resources, for example, processing units.

In the case of a multiprocessor computing system, the processing units may all be part of a single multiprocessor computing device, such as a high power workstation with multiple processors, or may each be part of a respective single processor computer, which together form a bank or network of servers or workstations each of which includes a single processor, e.g. a single CPU.

A task directing unit, which may be a client processor in a distributed computing environment, such as a network or the World Wide Web, or part of a multiprocessor computing device itself, is interconnectable to each of the plurality of resources. The task directing unit is configured to first obtain load information representing a loading of each of a number of resources selected uniformly at random (u.a.r.). Preferably, the task directing unit simultaneously queries each of the randomly selected resources for load information. Each of the randomly selected resources is configured to respond to the query with load information representing its loading. It will be understood that in a multiserver environment the system will typically include multiple task directing units, e.g., multiple clients.

The load information typically represents items, e.g., tasks or jobs, queued for servicing by the resource. The load information may be current information but is more likely to be somewhat stale information. For example, all processing unit loading information may be a fixed period out of date, or each processing unit's loading information may be out of date by a different or variable period of time. In any event, the load information will typically be the best information reasonably available from each of the resources selected uniformly at random.

The number of randomly selected resources must be at least 1 and should be substantially less than the total number of resources. Preferably, upon the arrival of a new task, the task directing unit will randomly select 2 resources uniformly at random. For different priority items, a different number of resources, such as 3, can be selected uniformly at random by the task directing unit. For example, processing items for certain users may be consistently given a higher priority than processing items for certain other users. A higher priority might also be set for the same users depending upon the type of items to be serviced. Hence, the task directing unit may also be configured to allow selection of priorities and to identify the correct priority for the item to be serviced on the basis of the type of item or the user for whom the item will be serviced. In any event, preferably the task directing unit selects uniformly at random no more than twenty percent (20%) of the total number of resources, although it will be understood that normally the number of randomly selected resources will be substantially less and will most preferably be just two resources.

The task directing unit next identifies the least loaded of the resources selected uniformly at random from the obtained load information. The item is then directed to the identified least loaded resource among the randomly selected resources for servicing the item. If the task directing unit identifies multiple resources which are the least loaded of the randomly selected resources, e.g. multiple of randomly selected resources having substantially equal loading, one of the least loaded resources may be arbitrarily selected for servicing the item.

The task directing unit may be a computer or other device which is controlled in accordance with programming instructions stored on a storage medium, such as a hard or floppy disc, compact disk (CD), read only memory (ROM), random access memory (RAM), or other electronic or optical storage device, and readable by the task directing unit processor. The programmed instructions cause the task directing unit to operate in the manner described above.

BEST MODE FOR CARRYING OUT THE INVENTION

Figure 1:
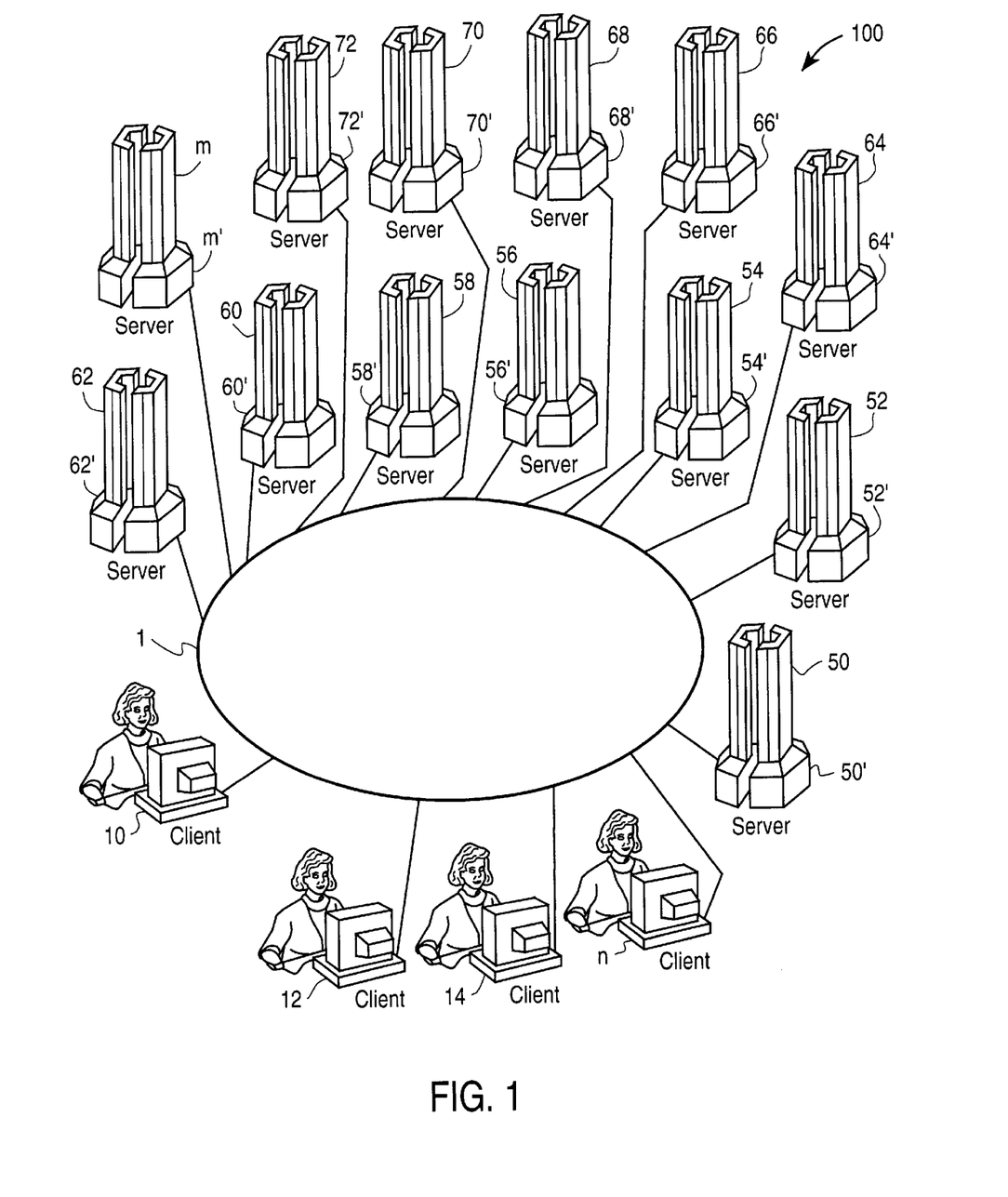
FIG. 1 is a multiserver processing system in accordance with the present invention.

FIG. 1 depicts a client-server network environment or system 100 which includes multiple clients 10-N and multiple servers 50-M interconnected via a network 1 which, for example, may be a local area, wide area, or other type of network including the World Wide Web. The clients 10-N may be personal computers, high-powered workstations, or other types of devices capable of querying the multiple servers 50-M via the network 1, and receiving information back from the servers 50-M. It will be recognized that other types of client devices including telephones, network computers, i.e., a computer with limited processing capability, set top boxes, and portable computing devices such as a portable computer or notepad, or any other device capable of performing in the manner described herein, could serve as one or more of the clients 10-N.

Each client has the ability via the network to request service from the bank of servers 50-M. The task may be a request to process data or to access data or other information stored on the server or some separate device (not shown) having a memory. Each request is queued within the server. Each server includes a first-in-first-out (FIFO) task queue 50'-M' for queuing each service request.

For simplicity, it will be assumed for purposes of the following description, that each of the respective servers 50-M are substantially similar and accordingly the system can be considered homogeneous. Accordingly, it is desirable that the respective queues 50'-M' associated with each of the servers 50-M be equally loaded with tasks, i.e., service requests, from the respective clients 10-N. It will of course be understood by those skilled in the art that if the respective servers 50-M are different, for example, in their processing speeds, i.e., if the system is non-homogeneous, it is preferable to provide weighted queue loadings taking into account the different service capabilities of the respective servers in processing data or servicing other requests received from the clients 10-N. It should also be noted that, although the system will be described in the context of tasks originating at the respective clients 10-N, the actual task request could be generated elsewhere and conveyed to client, for example, over the network 1, and then conveyed by the client to the server which is selected to perform the applicable task. In such a system the client would be solely responsible for directing the task to a selected server in accordance with the invention as will be described in detail below.

Typically, the number of clients 10-N will far exceed the number of servers 50-M available for servicing tasks requested by respective clients 10-N, but the server queues are sufficiently sized such that there is always space available in the queues of many of the servers during maximum loading of the system 100 to accept tasks from clients 10-N. Accordingly, the system should never be overloaded with respect to space in the queues.

Typically, tasks submitted to the servers 50-M must be serviced as soon as possible. In order for the system 100 to meet this requirement, the ideal solution is to have the respective queues of the servers 50-M equally loaded at any given time. That is, if all servers 50-M are equally loaded, each task will be performed and results returned to the client 10-N in approximately the same period of time. In such a case, the turn-around time period should be acceptable if sufficient servers have been provided for the number of tasks and response times required by the users associated with clients 10-N. However, to obtain such a perfectly balanced distribution of tasks is in many cases impractical, if not impossible, as discussed above.

In multiserver systems such as system 100 of FIG. 1, the load data, i.e., the queue loading, for each server changes each time a new task is entered into or leaves the queue of that server. If the current server loading can be determined at any given instant of time, a client could, in theory, query all servers 50-M for the current load information prior to directing the task to a particular one of the servers 50-M for servicing. However, even in such a case, the time delay between the transmission of the current load information to the server and the receipt of the task by the server may result in the server receiving the task having an actual loading at the time of receipt which is different than that indicated at the time of transmission of the load information. Hence, the recipient server may not be the least loaded server at the time of receipt of the task.

Further, as has been previously discussed, if a number of the clients 10-N are requesting load information at substantially the same time, or within a short period of time, e.g., the time period between updates of server loading information, numerous tasks may be directed to a particular server based upon the same load information. The resultant herding effect will cause an unbalanced loading, and perhaps even overloading, of one or more server queues.

Additionally, if the load information at the server is stale for any reason, the information available for use in deciding which server to direct tasks to is flawed from the start and accordingly its use can lead to a significant imbalance in the loadings of the respective servers 50-M. Further yet, if only a single server is randomly selected by an applicable client for performing a desired task, a significant loading imbalance can also occur. Such loading imbalances will necessarily result in time delays in performing the task after the task has been forwarded from the client to the applicable server for servicing.

In accordance with the present invention, rather than attempting to select the least loaded of all the servers 50-M or simply forwarding a task to a randomly selected one of the servers 50-M, a number of servers selected uniformly at random are queried for load information by the client having a task to be performed. The number of servers to be queried is, in all cases, substantially less than the total number of servers available for servicing the task request. In the system 100 of FIG. 1, servers 50-M are available to service task request from the clients 10-N. Preferably no more than twenty percent (20%) of the servers are randomly selected for querying loading information. That is, if the system configuration of FIG. 1 has 100 servers, preferably no more than 20 servers would be randomly queried for load information. Even more preferably, as will be discussed further below, only two of the servers 50-M are randomly queried for load information by the client having a task requiring servicing by a server. Responsive to the client query, the queried servers selected uniformly at random transmit load information, which may be current but is more likely to be stale load information, back to the requesting client via the network 1. The recipient client identifies the least loaded of the two servers based upon the received load information and forwards the task to that server.

For example, if client 12 has a task requiring service by one of the servers 50-M, the client 12 generates and transmits via the network 1 a query to two servers selected uniformly at random, say 60 and 66. Beneficially the query is sent by the client 12 and received by the servers 60 and 66 simultaneously. Each of the servers 60 and 66 respond by providing load information, representing the task loadings within the respective queues 60' and 66', back to the client 12 via network 1. The client 12 processes the received information in accordance with its programmed instructions, to identify the least loaded of the servers 60 and 66 from the received load information. The client 12 then automatically directs the transmission of the task to the identified least loaded of the servers 60 and 66 for servicing.

The task may include a request for processing data or for downloading data stored on the server or on another memory device accessible by the servers. In any event, the task is received by the least loaded of the servers 60 or 66, and entered into the server's queue 60' or 66', as applicable. When the task is at the head of the queue, it is serviced by the server and the appropriate response is directed by the server to the client 12 via the network 1.

It may be beneficial for certain clients or tasks to be given a servicing priority over other clients or tasks. Some customers may require faster servicing of tasks by the servers 50-M then is required by other clients. For example, client 14 may represent an on-line banking service which requires that the user have information downloaded as soon as possible from servers 50-M in order to respond to questions raised by a waiting customer. Client 14 may be willing to pay an additional fee not paid by the other clients in order to ensure priority service. In such a case, the client 14 may be configured such that rather than querying only two randomly selected servers regarding loading information, a total of three randomly selected servers are queried. As will be discussed further below, by querying an additional server and forwarding the task to the least loaded of the three randomly selected servers, the task may be directed to a less loaded server under certain circumstances than would be the case if only two randomly selected servers were queried for load information.

Certain clients could also be configured such that different tasks originating from a single client would receive higher priority. In this regard, if client 10 generates or forwards different types of tasks and certain of these tasks require a higher priority than other tasks, the client may be configured to distinguish between the different tasks and to query three servers selected uniformly at random for a higher priority task and two servers for lower priority task.

It will of course be recognized that multiple different priorities may be serviced by the same bank of servers and accordingly, even more servers could be queried as the priority increases or decreases, depending upon the circumstances. For example, assuming the number of servers 50-M is 100, up to 19 different priority levels could be serviced, with two randomly selected servers being queried for load information at the lowest priority and twenty servers being queried for load information at the highest priority. As mentioned above, preferably no more than twenty percent (20%) of the total number of servers are randomly queried. This is because, as will be further described below, as the number of randomly selected servers approaches the total number of servers, herding will likely occur resulting in an unbalanced loading of the servers and, hence, delays of servicing tasks at the overloaded server(s).

FIGS. 2–6 show the behavior of the system using various strategies for directing task to the multiple servers 50-M. The graphs reflect curves associated with a 100 server system. Each graph plots the time a task remains within the server, i.e., the time during which the task is queued and serviced, against various update intervals of the loading information for each of the servers 50-M for various update mechanisms.

The curve reflecting a strategy of each client directing task to a single server selected uniformly at random is referenced with the letter A. The curve representing a strategy of querying all servers 50-M to determine the least loaded of the servers and directing the applicable task to the identified least loaded server is referenced with the letter B. The reference letter C is associated with the curve of each graph shown in FIGS. 2–6 which represents the most preferred strategy in accordance with the present invention, i.e., the querying of two servers selected uniformly at random and directing the applicable task to the least loaded of these servers. Finally, the curve representing a strategy based upon querying three of the 100 servers selected uniformly at random and directing the task to the least loaded of the three servers in accordance with an aspect of the invention, is identified with reference letter D.

In each of the graphs the letter T represents time and is in general time units (GTU's), where the scale is set so on average a task requires 1 GTU of service. At an update time interval indicated as 0, i.e., when T=0, the load information available at the time of request is perfect information, i.e., current information. Finally, it should be understood that although the graphs are for a 100 server system, the results will be substantially similar for a system having fewer or more servers. For example, the results would not change significantly if only a total of eight servers were available for processing tasks.

Figure 2:
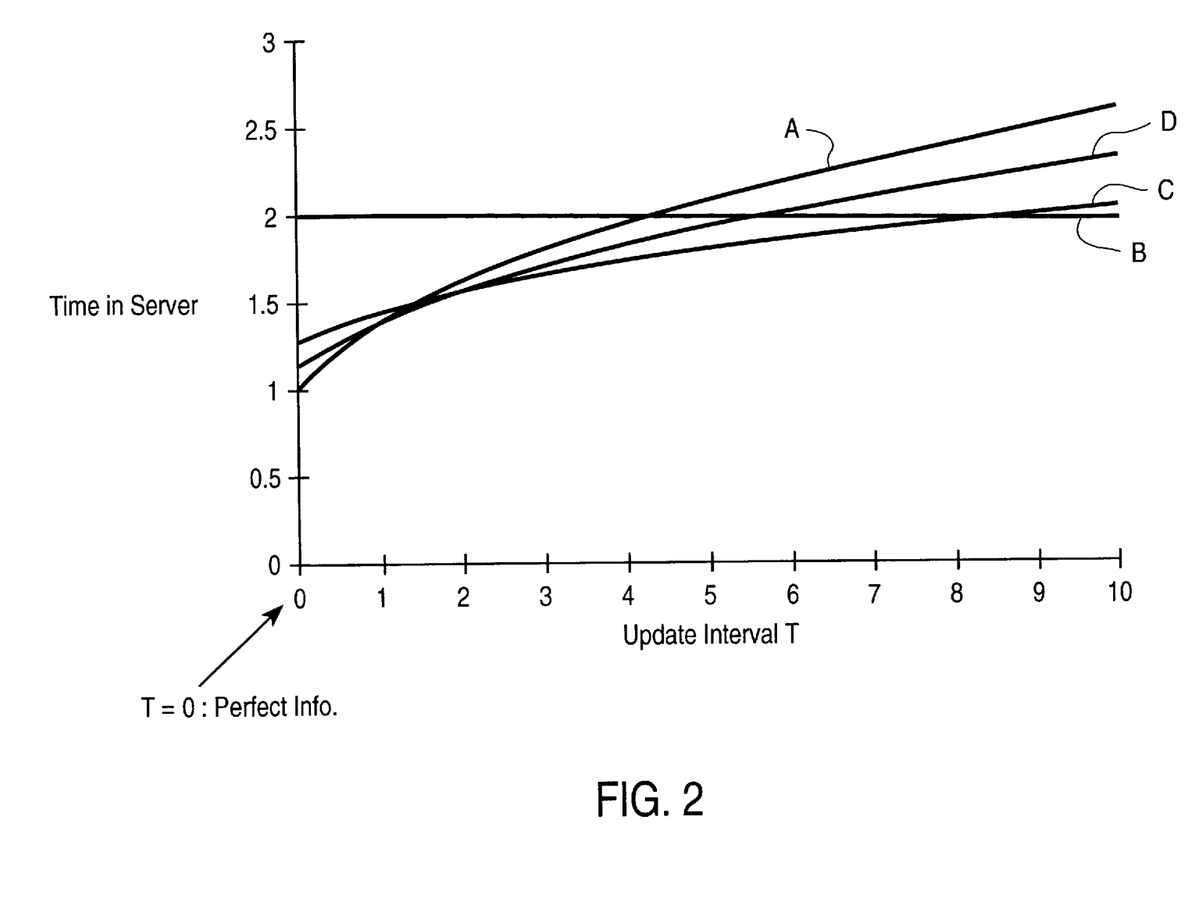
FIG. 2 is a graph indicative of the performance attainable by the FIG. 1 with varying numbers of selections and all servers are updated simultaneously every T seconds.

FIG. 2 represents a fifty percent (50%) system loading. That is, in FIG. 2, on average 50 tasks are directed to the 100 servers during each GTU. The servers' load information are updated according to the update interval T; that is, they are all updated every T GTU's. As indicated in FIG. 2, up to an update interval of approximately 1 GTU and ignoring transmission delays, the querying of all 100 servers and the directing of the task to the least loaded of the 100 servers by the client provides the fastest task servicing. Up to an update time interval of approximately 1.5 GTU's, the querying of three servers selected uniformly at random and the directing of the applicable task to the least loaded of these servers provides slightly reduced turn-around time from that obtainable by selecting the least loaded of all servers. Between 1.5 and 2.5 GTU's, herding begins and the random querying of two servers and the directing of the applicable task to the least loaded of these two servers provides the best response time up to an update interval of approximately 8.5 GTU's. After 8.5 GTU's, directing the applicable task to just one of the servers selected uniformly at random without considering the server loadings provides slightly better response than that obtained by querying two servers.

It will be noted that with update intervals close to zero, there is only a slight degradation in system performance using load information from two servers selected uniformly at random as compared to the querying of all servers for load information to identify a least loaded server. This relatively small cost in performance with a small update interval is offset by a significant reduction in overhead when randomly querying only two servers for load information. At relatively short time intervals, the querying of three servers provides turn around performance which is relatively close to that obtainable using load information obtained from all servers and may sometimes perform better than querying two.

At very long update intervals, the querying of two servers provides system turn-around times which are only slightly higher from those obtained by randomly directing each task to a server without any attempt to identifying the least loaded of the servers. Further, at very long update intervals, the use of load information from two servers selected uniformly at random provides a relatively significant advantage over the performance obtainable by querying three or more servers.

Figure 3:
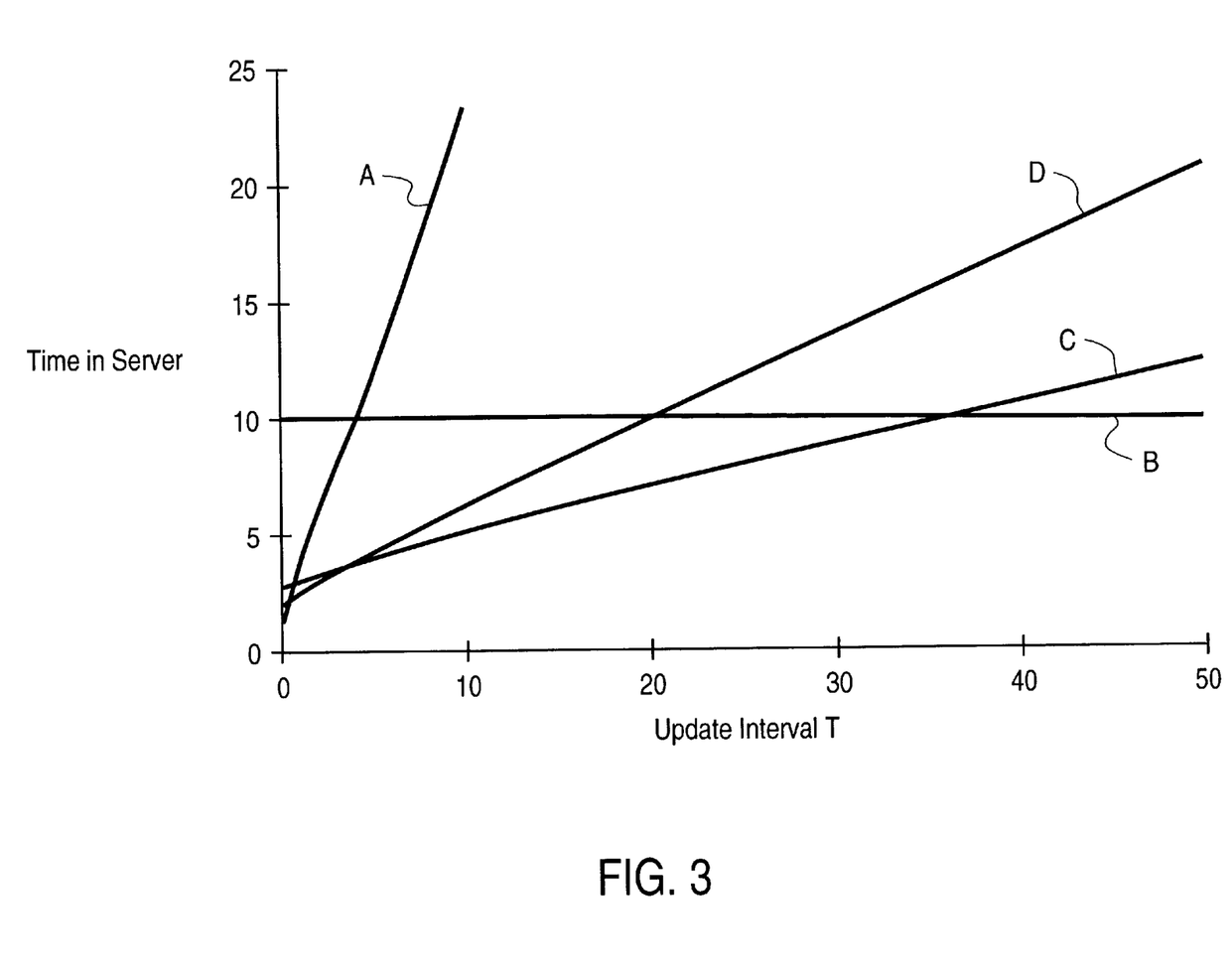
FIG. 3 is similar to the FIG. 2 graph, but indicative of a higher system loading.

FIG. 3 is similar to FIG. 2 but reflects a system loading of ninety percent (90%). That is, on average ninety task requests are submitted to the 100 servers during each GTU. As shown in FIG. 3, as the update interval increases, the servicing delays experienced if every server is queried prior to directing the task increases in accordance with the steeply sloped curve A. The use of load information from two servers selected uniformly at random, as represented by curve C, provides the best performance over update intervals from approximately 2.5 to 37.5 GTU's. Even beyond an update interval of 37.5 GTU's, the use of load information from two servers selected uniformly at random in choosing a server to service the task provides substantially better performance than either querying three servers as represented by curve D or all servers as represented by curve A. Further, at such update intervals, the use of load information from two servers provides relatively close performance to that obtainable by the directing tasks to a single randomly selected server without considering loading information, as represented by curve B of the graph.

Figure 3A:
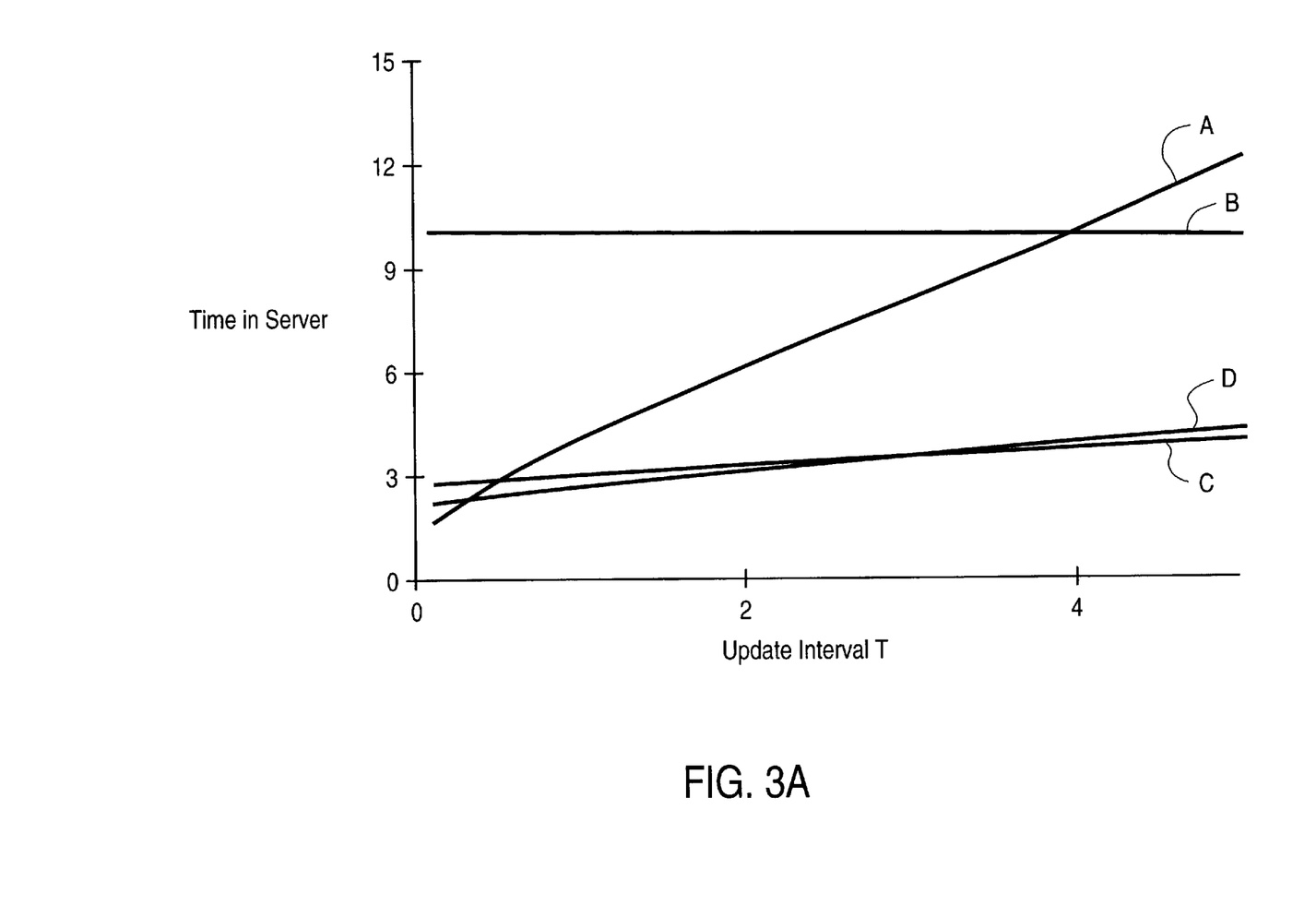
FIG. 3A is the same as FIG. 3, except shown at a different scale.

FIG. 3A shows in detail the portion of FIG. 3 having values of T from 0 to 0.5 GTU's. The use of load information from two servers selected uniformly at random provides excellent results throughout the update intervals shown. The use of load information from three servers selected uniformly at random provides slightly enhanced performance if the update interval is approximately 3 GTU's or below. Only at update intervals of less than approximately 0.2 GTU's does the querying of loading information from all servers provide enhanced performance, and even within this very short interval range the enhancement in the performance over than obtainable by querying two or three servers is relatively insignificant.

Figure 4:
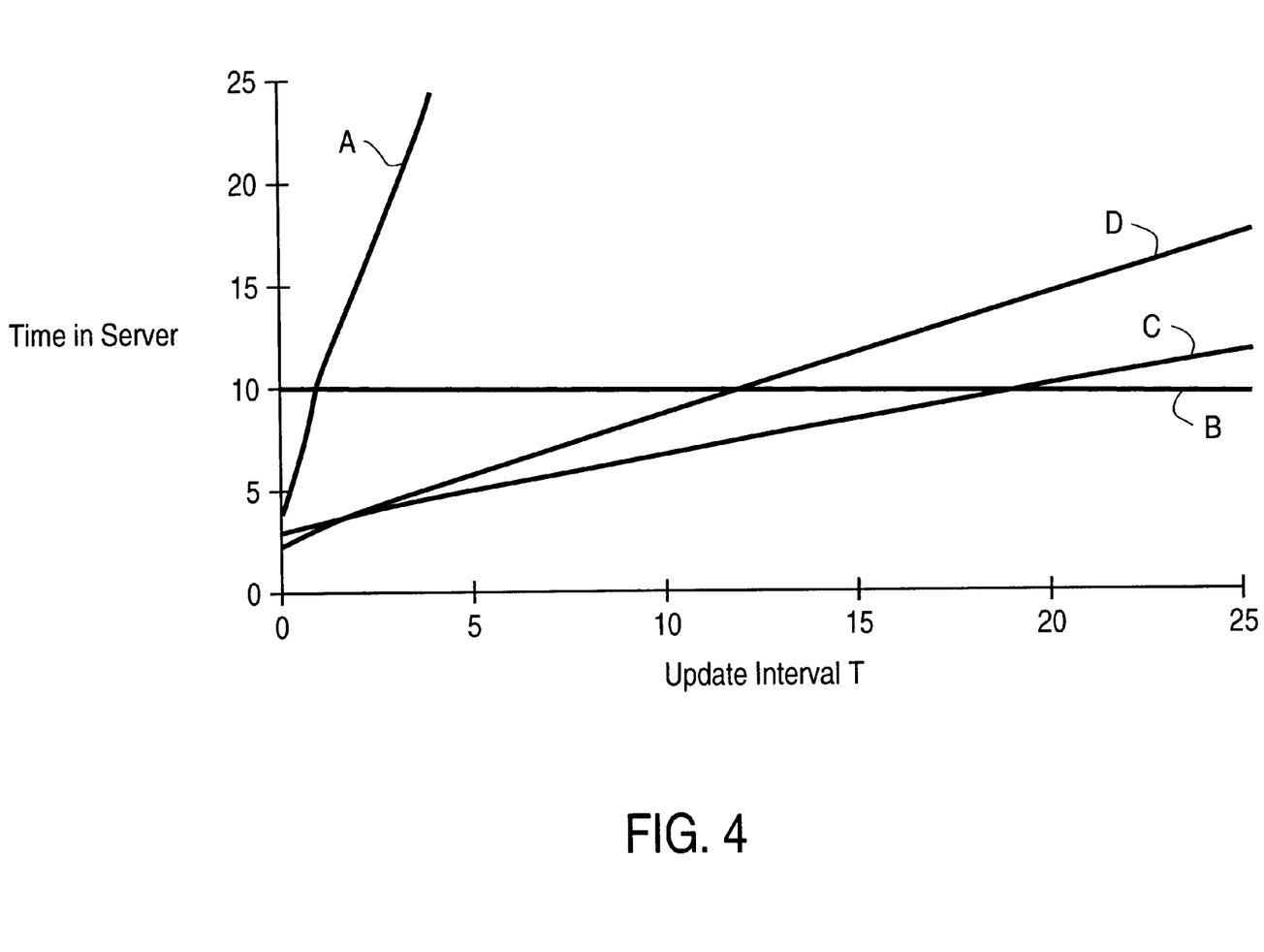
FIG. 4 is similar to FIG. 3, except that the stale information is always T seconds behind.

FIG. 4 shows still another graph with the system at a ninety percent (90%) loading, i.e., 90 tasks are forwarded to the 100 servers during each GTU. In this graph the servers are updated such that the available loading information is always stale by a fixed number of GTU's. Here again, the use of load information from two servers selected uniformly at random to determine where to direct task for servicing provides excellent results through a wide range of update intervals.

Figure 5:
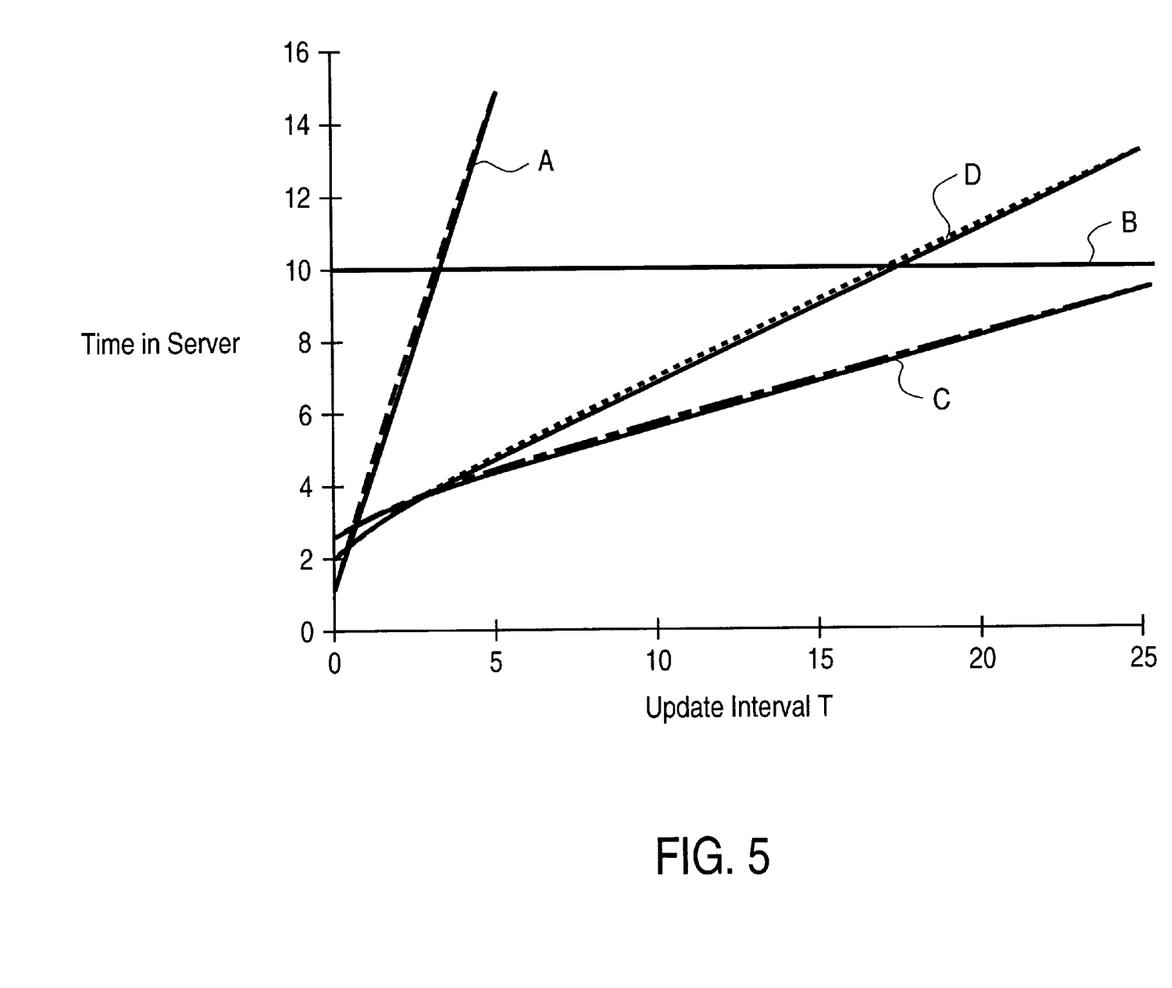
FIG. 5 is similar to FIG. 3, except that the age of the stale information is given by a random distribution.

FIG. 5 is similar to FIG. 4 except that the available load information is stale by an amount which varies uniformly between T/2 and 3T/2, T being the update interval. Here again, the results attainable utilizing load information from two servers selected uniformly at random provides excellent results.

Figure 6:
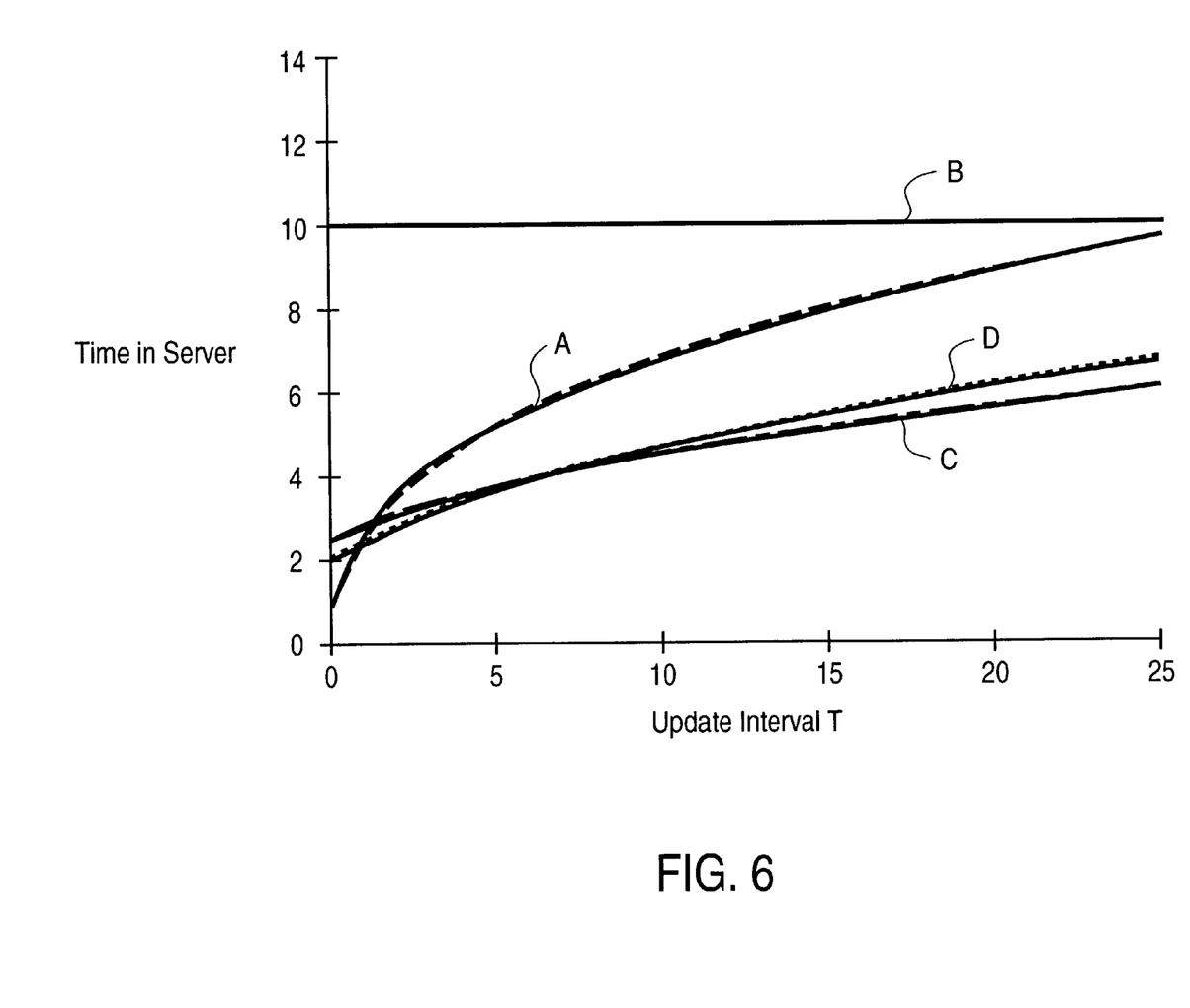
FIG. 6 is similar to FIG. 4, except that another random distribution is used for the age of the stale information.

FIG. 6 is similar to FIG. 5, except the staleness of the information uniformly varies between 0 and 2T. Once again, as indicated in FIG. 6, the use of load information from two or three servers selected uniformly at random provides excellent results throughout a large range of update intervals.

It should be noted that on occasion a query of two or three servers selected uniformly at random could result in substantially identical load information being returned to the applicable client 10-N. In such situations, the client would identify two different servers as the least loaded of the randomly selected servers. Preferably, in such a case, the client is configured or programmed to arbitrarily select one of the two identified least loaded servers and to direct the task to the arbitrarily selected server.

Further, as has been previously discussed, each client can be configured or programmed so as to identify a priority associated with each task if multiple priorities are available. In such cases, the client will query either two or more servers selected uniformly at random for load data depending upon the priority.

Referring first to FIG. 1, as shown the system 100 includes one or more client station 10-N. The client stations 10-N are connected to network 1 which may be a local, wide, virtual or other type of network or could be the World Wide Web. The client stations 10-N can communicate with any of the servers 50-M via the network 1 to access or process data on the servers.

Figure 7:
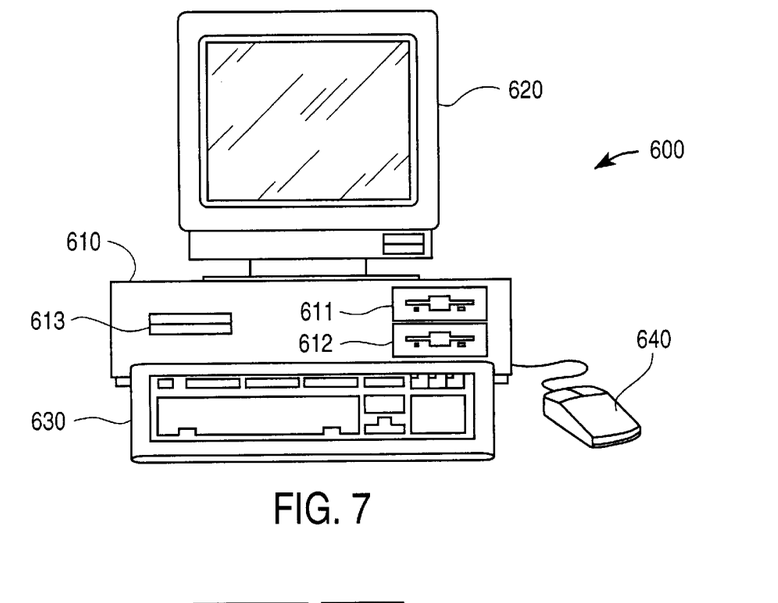
FIG. 7 depicts a computer suitable for use as the client depicted in FIG. 1.
Figure 8:
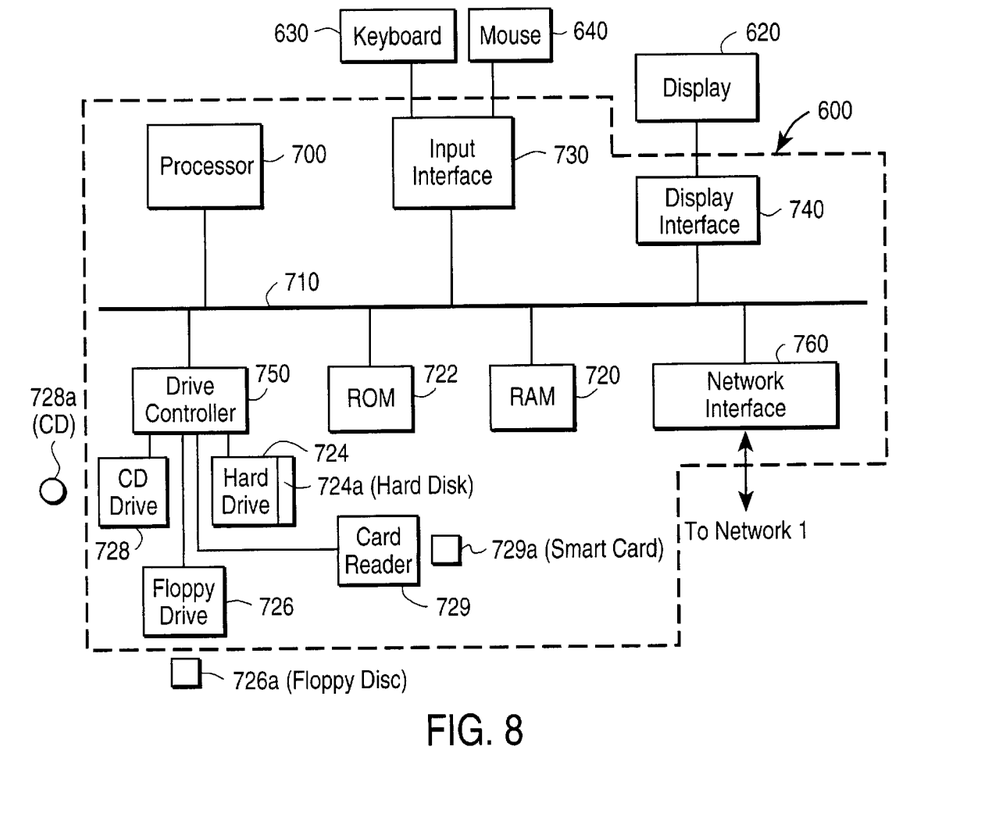
FIG. 8 is an exemplary block diagram of the computer depicted in FIG. 7.

Each client is typically a commercially available personal computer or work station, but could be any other type device capable of functioning to query a number of servers for load information and direct a task to an identified least loaded of these servers in the manner previously described. FIGS. 7 and 8 depict an exemplary computer suitable for use as some or all of the clients 10-N shown in FIG. 1, which, as discussed above, serve as task directing units.

The functionality of the computer depicted in FIGS. 7 and 8 corresponds to its programming instructions which control its operation. It will be recognized that only routine programming is required to implement the required instructions on the described computer such that the computer is controlled by the programming to operate in accordance with the invention.

The computer depicted in FIGS. 7 and 8 has conventional components and a conventional configuration. Routine operations performed by the depicted components will generally not be described, such operations being well understood in the art.

Referring now to FIG. 7, the computer 600 includes a main unit 610 with slots 611, 612 and 613, respectively provided for loading programming or data from a floppy disc, compact disc (CD) and smart card onto the computer 600. The computer 600 also includes a keyboard 630 and mouse 640 which serve as user input devices. A monitor display 620 is also provided to visually communicate information to the user. Virtually any commercially available keyboard, mouse and monitor can be utilized.

As depicted in FIG. 8, the computer 600 has a processor 700 which is interconnected via bus 710 with various storage devices including random access memory (RAM) 720, read only memory (ROM) 722 and hard drive 724, having a hard disk 724a and drive controller 750, all of which serve as a storage medium on which computer programming and/or data can be stored for access by the processor 700. The processor 700 could, for example, be an Alpha™ or Pentium™ processor. The processor 700 is interconnected via bus 710 with various other storage devices such as the floppy disc drive 726, the CD drive 728 and the card reader 729 which are capable of being controlled by drive controller 750 to read computer programming and/or data stored on a floppy disc 726a, CD 728a or smart card 729a when inserted into the appropriate slot 611, 612 or 613 in the unit 610. Preferably, the computer 600 has its unique programming instructions stored generally on its ROM or hard disk, but loaded onto the RAM during operations. Data which is required to be processed or otherwise utilized during operations is preferably also stored on the RAM during the operational period. By accessing the stored computer programming, the processor 700 is driven to operate in accordance with the present invention.

The processor 700 is also operatively connected to the keyboard 630 and/or mouse 640, via input interface 730. The display monitor 620 is interconnected to the processor 700, via display interface 740, to facilitate the display of information to the user. The network interface 760 is provided to interconnect the processor 700 to the network 1 depicted in FIG. 1 and accordingly allow communications between the computer 600 and other network devices. A high-speed network interface, including, for example, a high-speed modem, is preferred although not mandatory. Since a computer 600 serves as each of the clients, or task directing unit, 10-N, the network interface 760 allows communications with network servers 50-M of FIG. 1. The computer, if desired, could also or alternatively include other components (not shown), such as an optical storage medium, or may exclude depicted components.

The inter-operation of the various components of the computer depicted in FIGS. 7 and 8 in implementing the present invention as described above with reference to FIG. 1 will now be described.

In accordance with operator commands entered using the keyboard 630 or mouse 640 and transmitted to the processor 700 via the input interface 730 and bus 710, or received via the network interface 760 and forwarded to processor 700 over the bus 710, the processor 700, in accordance with the programming instructions, which are preferably available on the RAM 720 during client operations, generates a signal requesting loading information from two of the servers 50-M of FIG. 1 selected uniformly at random. The signal is forwarded via the bus 710 to the network interface 760. The network interface 760 transmits the requests simultaneously to the two servers selected uniformly at random via the network 1 of FIG. 1.

In response, the recipient servers, i.e., the servers selected uniformly at random, respectively transmit available loading information back to the client computer via the network 1. The information transmitted back by the randomly selected servers, which may be current but is more likely to be stale information, is received from the network 1 by the network interface 760 and forwarded via the bus 710 to the processor 700. The processor 700, in accordance with its programmed instructions, compares the received loading information and on this basis identifies a least loaded of the two servers selected uniformly at random.

Having identified the least loaded of the servers selected uniformly at random, the processor generates a signal corresponding to a request for servicing of a particular task to the identified least loaded of the servers selected uniformly at random. The signal is forwarded to the network interface 760 via bus 710. The network interface 760 transmits the request via the network 1 to the identified least loaded of the servers selected uniformly at random. The task is then entered at the end of the recipient server's queue and serviced by the recipient server when the request reaches the head of the queue.

If the system is to provide for task related priorities, the processor 700, in accordance with its stored programming instructions, will also identify the priority of the task prior to selecting the servers to be queried for loading information. In this regard, the number of selected servers might be varied by the processor 700 in accordance with the task priority.

If individual clients are to be provided with different priorities, processor 700 will function in accordance with its stored programming instructions to select the appropriate number of servers to query for loading information based upon the service priority of the applicable client.

If the loading information received by the processor 700 via the network interface 760 is identical or substantially the same for two or more of the servers selected uniformly at random which have been queried, the processor, in accordance with its stored instructions, will arbitrarily select one of the identified least loaded of the servers selected uniformly at random and address the task to the arbitrarily selected server for servicing.

Figure 9:
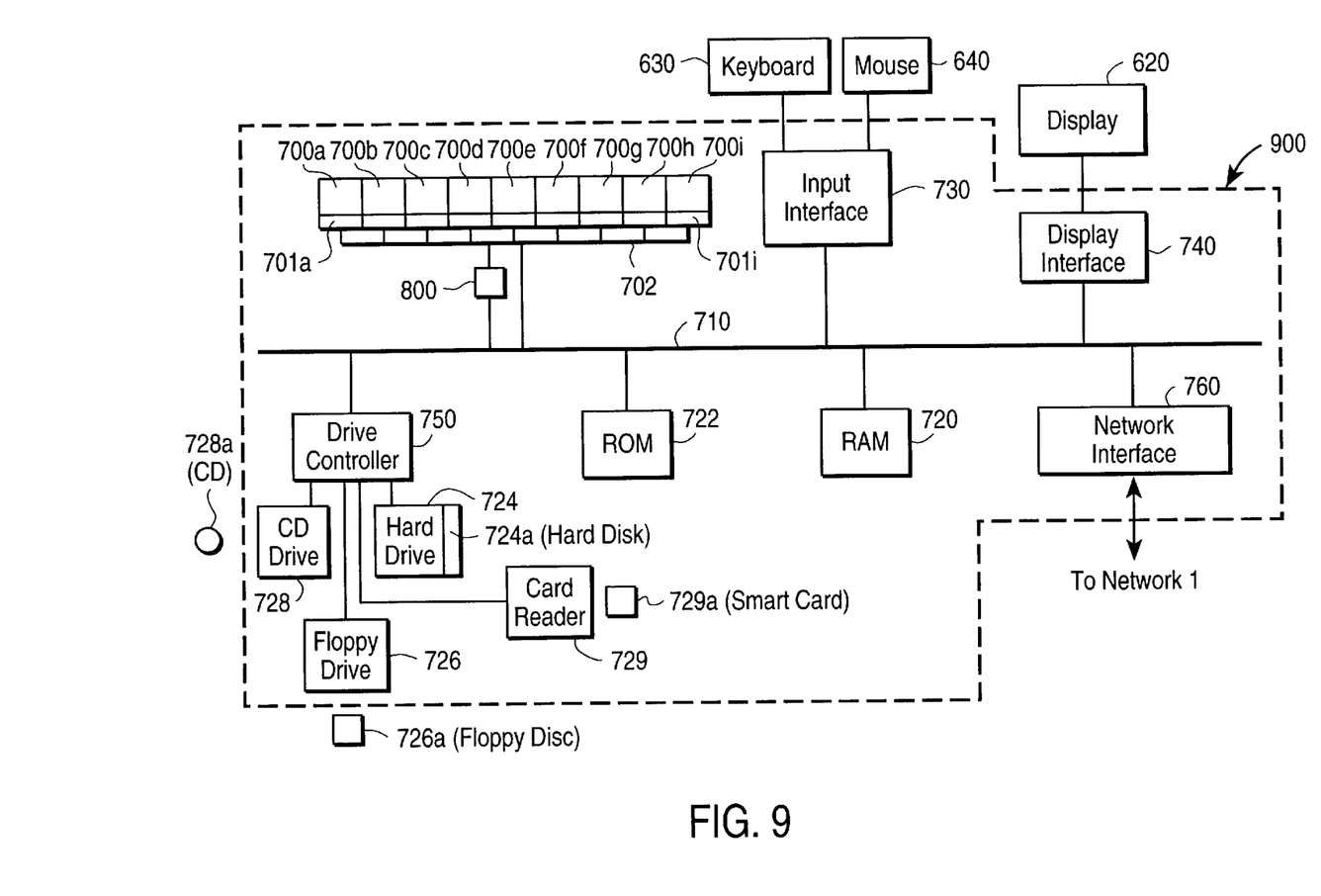
FIG. 9 is an exemplary block diagram of a multiprocessor workstation in accordance with the present invention.

FIG. 9 depicts a multiprocessor workstation 900 which could be utilized as some number of the servers 50-M in FIG. 1. In particular, the station 900 depicted in FIG. 9 has a bank of processors 700A–700I and associated processor queues 701A–701I. A further processor 800, which serves as a task directing unit, is also included in the station 900. Other components of the station 900 function identically to those described with reference to FIG. 8.

It will be recognized that when commands for processing tasks are entered via the input interface 730 or network interface 760 to station 900, the command is forwarded via the bus 710 to the processor 800 which, in accordance with the stored programming instructions stored on RAM 720, queries two of the processors 700A–700I selected uniformly at random for loading information. The query is directed via a multiprocessor bus 702 to the processors selected uniformly at random. The recipient processors, in accordance with their programming instructions which are also stored on RAM 720 during operations, return loading information back to the processor 800. The processor 800 identifies the least loaded of the queried processors of the bank of processors 700A–700I and directs the task to the queue of the identified least loaded processor.

It should be further recognized that, in this regard, the processor 800 functions as a task directing unit in very much the same manner as the processor 700 of the client computer 600 of FIG. 8, as has been discussed above. Hence, the processor 800 is also beneficially programmed to arbitrarily select between two identified least loaded selected processors and to prioritize based upon task type or client.

As described in detail above, the present invention provides enhanced optimization in processing tasks in a multiprocessor environment, particularly when only stale load data is available. The invention avoids the effects of herding in a multi-user environment and provides enhanced task processing optimization while reducing processing overhead.

From the above-described graphs it can be seen that although choosing the shortest queue based upon load information from all servers provides the best performance when the load information is current, i.e., when T=0, for even very small values of T, this strategy performs quite poorly, especially under high system loads. As indicated above, choosing just two servers is advantageous over a wide range of loading information update intervals. Only when the update interval becomes extremely large, may better performance be obtained by simply selecting uniformly at random a single server without consideration of loading information.

Hence, if the loading information update interval T is sufficiently small or current load information is available, then directing a task to a shortest queue, i.e., as represented by curve A of each graph, performs very well but at a significant overhead cost. As the update interval grows longer, such a strategy will result in herd behavior and degraded system performance. As the loading information update interval T increases towards infinity, directing tasks randomly to a single server, i.e., as represented by curve B in each graph, without consideration of server loadings provides enhanced system performance. However, over a large range of practical update intervals T, the querying of a very small number of servers selected uniformly at random for loading information to determine where to direct the task provides excellent, if not superior, performance results with a substantial reduction in overhead when compared with a strategy of querying a large number or all of the servers for load information before directing the task.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

We claim:

1. A method of selecting one of a number of resources for servicing an item, comprising the steps of:

randomly selecting a subset of the resources, the subset having an associated number of resources that is greater than 1 and substantially less than the number of resources;

querying each of the randomly selected resources in the subset for load information after said step of selecting;

obtaining, in response to said step of querying, load information representing a loading of each resource in the subset from each resource in the subset;

identifying a least loaded of the randomly selected resources in the subset from the obtained load information; and directing the item to the identified least loaded randomly selected resource of the subset for servicing on the item.

2. A method according to claim 1, wherein the resources are processing units, the item is data and the load information represents the data awaiting servicing by each of the randomly selected processing units in the subset.

3. A method according to claim 1, wherein the random selection is made uniformly at random.

4. A method according to claim 1, wherein the random selection is made non-uniformly.

5. A method according to claim 1, wherein the resources are computer programs, the item is data and the load information represents the data awaiting processing by each of the randomly selected computer programs in the subset.

6. A method according to claim 1, wherein the loading information represents items queued on a first-in-first-out basis for servicing by each of the randomly selected resources in the subset.

7. A method according to claim 1, wherein the number of randomly selected resources is 2.

8. A method according to claim 1, wherein the number of randomly selected resources is a fixed number equal to at least 3 and no more than 10.

9. A method according to claim 1, wherein the number of randomly selected resources is no more than twenty percent of the number of resources.

10. A method according to claim 1, wherein the load information represents the current loading of at least one of the randomly selected resources in the subset.

11. A method according to claim 1, wherein the load information represents stale load information relating to at least one of the randomly selected resources in the subset.

12. A method according to claim 1, wherein the obtaining of the load information includes:

controlling each of the randomly selected resources in the subset to respond to the query with load information representing the loading of the responding randomly selected resource.

13. A method according to claim 12, wherein each of the randomly selected resources in the subset is queried simultaneously.

14. A method according to claim 1, wherein the identified least loaded selected resource is a first least loaded selected resource and further comprising the steps of:

identifying a second least loaded selected resource from the obtained load information, the first and the second least loaded resources having substantially equal loadings; and arbitrarily selecting one of the first and the second least loaded resources for servicing the item.

15. A method according to claim 1, wherein the item is a first item, the loading information is first loading information, the number of randomly selected resources in the subset is a number of first randomly selected resources, the identified least loaded of the randomly selected resources is an identified least loaded of the first randomly selected resources, and further comprising the steps of:

obtaining second load information representing a loading of each of a number of second randomly selected ones of the resources, the number of second randomly selected resources being greater than the number of first randomly selected resources;

identifying a least loaded of the second randomly selected resources from the obtained second load information; and directing a second item to the identified least loaded of the second selected resources for servicing the second item.

16. A method according to claim 15, wherein the number of first randomly selected resources is 2 and the number of second randomly selected resources is 3.

17. A method according to claim 15, wherein the first item is a type of item and the second item is a different type of item.

18. A method according to claim 15, wherein the first item is associated with a customer and the second item is associated with a different customer.

19. A method according to claim 15, further comprising the steps of:

selecting a priority for servicing the first item;

selecting a priority for servicing the second item;

wherein the selected priority for servicing the first item is different than the selected priority for servicing on the second item.

20. A multi-resource system for servicing an item, comprising:

a plurality of resources having a total number of resources N;

a task directing unit interconnectable to each of the plurality of resources and configured (i) to randomly select a subset of the resources, the subset having an associated number of resources that is greater than 1 and substantially less than the total number of resources N; (ii) to query each of the randomly selected resources in the subset for load information after said step of selecting; (iii) to obtain load information representing a loading of each resource in the subset; (iv) to identify a least loaded of the randomly selected resources in the subset from the obtained load information, and (v) to direct the item to the identified least loaded of the randomly selected resources of the subset for servicing the item.

21. A system according to claim 20, wherein the resources are processing units, the item is data and the load information is data awaiting for processing by the identified least loaded processing unit.

22. A system according to claim 20, wherein the resources are computer programs, the item is data and the load information includes data awaiting processing by each of the randomly selected computer programs in the subset.

23. A system according to claim 20, wherein the task directing unit is configured to randomly select 2 resources.

24. A system according to claim 20, wherein the task directing unit is configured to randomly select no more than twenty percent of the total number of resources.

25. A system according to claim 20, wherein the load information represents the current loading of at least one of the randomly selected resources in the subset.

26. A system according to claim 20, wherein the load information represents a previous loading of at least one of the randomly selected resources in the subset.

27. A system according to claim 20, wherein:

the task directing unit is configured to query each of he randomly selected resources in the subset for load information; and each of the randomly selected resources in the subset includes a FIFO queue and is configured to respond to the query with load information representing the loading of the queue of the responding randomly selected resource.

28. A system according to claim 27, wherein the task directing unit is configured to query each of the selected resources in the subset simultaneously.

29. A system according to claim 20, wherein:

the identified least loaded selected resource is a first least loaded selected resource; and the task directing unit is configured to identify a second least loaded selected resource from the obtained load information, the first and the second least loaded resources having substantially equal loadings, and to arbitrarily select one of the first and the second least loaded resources.

30. A system according to claim 20, wherein;

the item is a first item;

the loading information is first loading information;

the number of randomly selected resources in the subset is a number of first randomly selected resources;

the identified least loaded of the selected resources is an identified least loaded of the first randomly selected resources;

the task directing unit is configured (i) to obtain second load information representing a loading of each of a number of second randomly selected ones of the plurality of resources, the number of second randomly selected resources being different than the number of first randomly selected resources, and (ii) to identify a least loaded of the second randomly selected resources from the obtained second load information, and (iii) to direct a second item to the identified least loaded of the second randomly selected resources for servicing the second item.

31. A system according to claim 20, wherein the task directing unit is a first task directing unit, the item is a first item, the loading information is first loading information, the number of randomly selected resources is a number of first randomly selected resources, the identified least loaded of the selected resources in the subset is an identified least loaded first randomly selected resources, and further comprising:

a second task directing unit configured (i) to obtain second loading information representing a loading of each of a number of second randomly selected ones of the plurality of resources, the number of second randomly selected resources being different than the number of first randomly selected resources, (ii) to identify a least loaded of the second randomly selected resources from the obtained second loading information, and (iii) to direct a second item to the identified least loaded of the second randomly selected resources for servicing the second item.

32. A system according to claim 31, wherein the first item and the second item are different types of item.

33. A system according to claim 20, wherein the task directing unit is configured to randomly select a fixed number of resources equal to at least 3 and no more than 10.

34. An article of manufacture for processing data in a multiprocessor environment, comprising:

computer readable storage medium; and computer programming stored on said storage medium;

wherein said stored computer programming is configured to be readable from said computer readable storage medium by a computer and thereby cause said computer to operate so as to:

randomly select a subset of at least 2 processing units, the subset having an associated number of processing units that is substantially less than the number of processing units;

query the processing units in the subset for load information;

obtain, in response to the query, load information representing a loading of each resource in the subset from each resource in the subset;

identify a least loaded of the randomly selected processing units in the subset from the obtained load information; and direct the data to the identified least loaded selected processing unit in the subset for processing.

35. An article of manufacture according to claim 34, wherein the data includes first data and second data, the directed data is first data, the load information is the first load information, the number of randomly selected processing units is a number of first randomly selected processing units, the identified least loaded of the selected processing units is an identified least loaded of the first randomly selected processing units, and said stored computer programming is configured to be readable from said computer readable storage medium by the computer to thereby cause said computer to operate so as to:

associate the first data with a first processing priority;

associate the second data with a second processing priority higher than the first processing priority;

query a number of second randomly selected ones of the processing units to obtain second load information representing data queued for processing by each of the second randomly selected processing units, the number of second randomly selected processing units being greater than the number of first randomly selected processing units;

identify a least loaded of the second randomly selected processing units from the obtained second load information; and direct the second data to the identified least loaded of the second randomly selected processing units for processing.

36. An article of manufacture according to claim 35, wherein the first data and the second data are different types of data.

* * * * *

UNITED STATES PATENT AND TRADEMARK OFFICE
CERTIFICATE OF CORRECTION

PATENT NO. : 5,991,808
DATED : November 23, 1999
INVENTOR(S) : Broder et al.

It is certified that error appears in the above-identified patent and that said Letters Patent is hereby corrected as shown below:

Column 14,
Line 32, delete "he" and insert therefor -- the --

Signed and Sealed this

Third Day of May, 2005

JON W. DUDAS
*Director of the United States Patent and Trademark Office*